United States Patent [19]

Clarke et al.

[11] 4,169,748

[45] * Oct. 2, 1979

[54] POST-PRESS EMBOSSING OF A CONSOLIDATED MAN-MADE BOARD

[75] Inventors: John T. Clarke, St. Charles; Royce K. Harker, Lombard, both of Ill.; Michael E. Hittmeier, Longview, Wash.; James W. Eaton, Elgin, Ill.

[73] Assignee: Masonite Corporation, Chicago, Ill.

[*] Notice: The portion of the term of this patent subsequent to Feb. 8, 1994, has been disclaimed.

[21] Appl. No.: 874,218

[22] Filed: Feb. 1, 1978

[51] Int. Cl.$^2$ .............................. B29J 5/04; B31F 1/00
[52] U.S. Cl. .................................. 156/62.2; 156/62.8; 156/220; 156/219; 156/323; 264/119
[58] Field of Search ............... 156/219, 220, 209, 222, 156/312, 323, 62.2, 62.8; 428/171, 236, 301; 264/119, 120, 123

[56] References Cited

U.S. PATENT DOCUMENTS

| | | | |
|---|---|---|---|
| 2,803,188 | 8/1957 | Duvall | 156/220 |
| 3,718,536 | 2/1973 | Downs et al. | 156/62.2 |
| 4,007,076 | 2/1977 | Clarke et al. | 156/62.8 |

FOREIGN PATENT DOCUMENTS 690285  4/1953  United Kingdom ..................... 156/219

*Primary Examiner*—John T. Goolkasian
*Assistant Examiner*—William H. Thrower
*Attorney, Agent, or Firm*—Mason, Kolehmainen, Rathburn & Wyss

[57] ABSTRACT

A consolidated man-made board, such as hardboard, is "post-press" embossed with a contoured embossing plate at a pressure of at least about 1000 psi, at a temperature in the range of about 400°–550° F. and for a period of time sufficient to permanently re-shape the surface of the consolidated board.

14 Claims, No Drawings

POST-PRESS EMBOSSING OF A CONSOLIDATED MAN-MADE BOARD

BACKGROUND OF THE INVENTION

A. Field of the Invention

This invention relates to a process for embossing a man-made board, and more particularly to a process for embossing or debossing a man-made cellulosic board at a high temperature and pressure after consolidation of the board. More specifically, the process of the present invention relates to embossing a man-made cellulosic board in a post-press embossing step.

Man-made consolidated boards include hardboard, chip board, particle board, panel board, acoustical board, insulation board and the like. The uses of such boards depend upon the physical characteristics such as the density of the board and the exterior embossing or decorative effect applied thereto. The qualities and physical characteristics of a board depend upon the conditions under which the board is manufactured, and the raw materials used to form the board.

There are two principal processes for the manufacture of man-made boards—the wet process and the dry process. In the wet process, the raw material is uniformly blended in a head box with copious quantities of water to form a slurry. The slurry is deposited onto a water-pervious support member, generally a Fourdrinier wire, where much of the water is removed leaving a wet mat of cellulosic material. The wet mat is transferred from the pervious support member and consolidated under heat and pressure to form the board. Typically, pressures of from 400 to 500 psi and temperatures up to about 400° F. are encountered in consolidation of a man-made board manufactured by the wet process.

The dry process is similar to the wet process except that the cellulosic fibers are first coated with a thermosetting resin binder, such as a phenol-formaldehyde resin, and are then randomly distributed into a mat by air blowing the resin-coated fibers onto a support member. In the dry process, the mat is pressed at temperatures up to about 450° F. and pressures less than about 1000 psi to cure the thermosetting resin and to compress the mat into an integral consolidated structure.

The process of embossing a wet mat in a platen press with a heated embossing plate is well known, especially in the manufacture of hardboard. An embossing plate is made with a surface contour of a desired design, such as wood graining. The heated embossing plate is pressed against the surface of the wet mat under sufficient pressure to impress the plate design into the surface of the panel and thereby consolidate the wet mat into a decorative man-made board.

Boards made in accordance with the dry process are also typically decorated or surface-designed by hot-pressing in a platen press with a heated embossing plate. In embossing mats made by either the wet or dry process, however, the man-made mat is embossed concurrently with being compressed into a consolidated, integral product so that the bonds between fibers are initially made in accordance with the final surface design of the product.

Much of the bonding necessary for cohesion and strength in a man-made board occurs during the consolidation of the board. Prior to drying a board made by the wet process, the board is weak, but the bonding forces created during the final consolidation are generally quite powerful. Generally the same bonding effect occurs in the final consolidation of the board made by the dry process. Prior to hot-pressing, the loosely disassociated cellulosic fibrous product is quite weak, but after hot-pressing the mat into its final configuration, it is very powerfully held together by the bonding which occurs during hot-pressing. Hot-pressing during consolidation causes a welding or coalescing of the cellulose fibers at the surface of the product so that the surface portion consists of wood re-made in modified form. It is very difficult to re-shape the surface of the consolidated product without again destroying these fiber-to-fiber surface welds.

As set forth above, the process of embossing a man-made board prior to consolidation to establish a surface design in a product is well known. However, because of the strong inter-fiber bonding which occurs during consolidation, no effective process has been developed by which a previously consolidated product can be post-press embossed to create a surface design or to re-design the surface of a consolidated product. To be effective, such a process cannot destroy the inter-fiber bonding established at the surface of the board during consolidation—yet the process must permanently re-shape the surface of the product.

One of the most difficult problems found by applicant in re-shaping the surface of a consolidated product is in maintaining "design fidelity" in the board. "Design fidelity" or simply "fidelity" as used herein is a measure of the accuracy of reproduction of the design of the embossing plate onto the surface of the consolidated board. Because of the strong interfiber bonding referred to above existing in a consolidate board, the re-shaped surface has a tendency to "spring-back" to its original surface design. "Spring-back" as used herein is the tendency of a re-shaped board to return to its original surface shape or contour.

No existing process is able to maintain a high degree of fidelity over extended periods of time by embossing a consolidated product because of the strong inter-fiber bonding occuring during initial consolidation.

The present invention relates to a process of embossing a consolidated man-made cellulosic board in such a manner that the strong inter-fiber bonding established during consolidation and densification is maintained, but the cellulosic material is apparently caused to "flow" to new locations to impart a different contour to the surface of the consolidated product. A process whereby a consolidated product can be embossed under heat and pressure, after already having undergone a first hot-press consolidation step, so that the inter-fiber bonds established during the first hot-press step are maintained, but re-oriented with the fibrous material in the new shape, is quite surprising in the art of man-made cellulosic board manufacture.

In accordance with the process set forth herein, a consolidated product is post-press embossed to establish new surface contours. The inter-fiber bonds established in initial consolidation are realigned to set the surface of the product permanently into a new design. The re-shaping is very effective so that very little spring-back occurs.

B. Prior Art

Many patents disclose hot-pressing as a step for consolidating a composite board into its final shape. Some of the hot-pressing consolidation procedures are disclosed in the following U.S. Pat. Nos.: 3,113,065 Newton: 2,388,487 and 3,002,878 Linzell: 2,888,376 Stewart:

3,428,727 Higgins; 3,758,357 Akerson; 3,788,929 Huttunen; 2,298,017 Loughborough; 2,803,188 Duvall; 3,681,115 Maher; 2,495,043 Willey et al; 3,699,203 Oshima et al; and 3,718,536 Downs. Some of the above patents also disclose the chemical treatment of the fibrous product prior to hot-pressing to enhance one or more properties of the final product. The following U.S. Pat. Nos. relate to the chemical treatment of a fibrous product: 2,811,470 Kenaga; 2,724,642 Brown; 2,692,183 Ericks; 2,395,311 Woodhouse; and 1,948,314 Pratt. Of the above patents, the U.S. Pat. Nos. 3,758,357 Akerson et al; 3,788,929 Huttenen and 2,298,017 Loughborough disclose hot-pressing a wood product for the purpose of bending the product. However, none of these three patents discloses post-press embossing with a contoured embossing plate and therefore do not encounter the fidelity problems encountered in re-shaping a previously consolidated product. The above-listed U.S. Pat. Nos. Downs 3,718,536 and Oshima 3,699,203 relate to a second hot-press step, but each patent discloses bonding the product into its final shape by providing a thermosettable plastic which sets on hot-pressing. The U.S. Pat. No. 2,803,188 Duvall relates to a hot-press embossing step after consolidation of an insulation board, but provides a hardenable coating composition so that spring-back over extended periods of time is not a significant factor.

CROSS-REFERENCE TO RELATED APPLICATION

In accordance with our prior application, now U.S. Pat. No. 4,007,078, a man-made board is post-press embossed by first pre-wetting the surface of the board prior to post-pressing. It has been found that the wetting pretreatment is unnecessary to achieve re-shaping of the board surface provided that the time of embossing is increased to about twice that required when the board is pre-wetted.

SUMMARY OF THE INVENTION

In brief, the process of the present invention comprises the steps of hot-pressing the surface of consolidated, man-made board with a heated embossing plate at a high temperature and pressure and for a period of time sufficient to permanently re-shape the surface of the board.

Accordingly, an object of the present invention is to provide a new and improved method of embossing a consolidated man-made board to permanently re-shape the surface of the board.

Another object of the present invention is to post-press emboss a consolidated man-made board to provide a new and improved method of re-shaping damaged or rejected consolidated man-made boards.

Another object of the present invention is to provide a new and improved method of embossing a consolidated man-made board by embossing under pressure sufficient to cause the fibrous material at and near the embossed surface of the board to laterally flow to a different location.

These and other objects and advantages of the present invention will be better understood with reference to the following detailed description of the invention.

DETAILED DESCRIPTION

A consolidated board is subjected to a hot-press step at a temperature in the range of 400° to 550° F., and at a pressure and for a period of time sufficient to establish and maintain accurate transference of detail from the embossing plate to the surface of the board for an extended period of time. Pressure is the most important variable in the pressure-temperature-time embossing conditions. By the appropriate selection of combinations of temperature, pressure, and time, a consolidated man-made board can be embossed to re-shape the surface with excellent design fidelity and very little spring-back.

PRESSURE-TEMPERATURE-TIME VARIABLES

With each pressure used there is a specific temperature range and time of embossing necessary to effectively re-shape a consolidated man-made product. An increase in any variable (temperature, time or pressure) enables a decrease in one or more of the remaining variables necessary for effective post-press embossing. Many of the pressure-temperature-time interactions will be specifically set forth, and others can be extrapolated from the data set forth herein. The times indicated are times of embossing under full pressure and do not include the loading and unloading or the buildup and decrease of pressure in the press.

PRESSURE

A pressure of about 4000 psi is preferred, but a wide range of pressures above 1000 psi are useful in the post-press embossing of a consolidated man-made board.

1000 psi: Pressure as low as about 1000 psi requires an embossing temperature of about 525°-550° F. for a period of time of at least 45 seconds. At a pressure of about 1000 psi and a temperature of 550° F., most man-made boards begin to char after a period of time of about 60 seconds. It is important when using a press temperature of about 550° F. that the board be removed from the press before charring occurs.

2000 psi: At a pressure of about 2000 psi effective postpress embossing can be achieved with temperatures of about 400° F. for a period of time of about 60-90 seconds. At 2000 psi, a temperature of at least 400° F. is necessary. Higher temperatures up to 550° F. can be employed with a corresponding decrease in time necessary for the required fidelity in the post-press embossed product. It is preferred to employ a temperature of at least 450° F. so that the press time can be reduced.

3000 psi: At a pressure of 3000 psi, it is necessary to employ a temperature of at least about 450° F. for a period of time of about 25-45 seconds. With higher temperatures up to about 550° F., the time period can be reduced accordingly.

4000 psi: At pressure above 3000 psi and temperature of 400°-550° F. the time necessary for effective post-press embossing is reduced to 10-15 seconds. Pressures higher than 4000 psi can be used with a corresponding decrease in press time, but higher capability presses do not provide any noticeable improvement.

TEMPERATURE

To achieve the necessary fidelity when post-press embossing a consolidated man-made board, it is always necessary to employ a temperature of at least about 400° F. and not greater than about 650° F. It has been found that temperatures below about 400° F. are insufficient to effectively re-design the surface of a consolidated board while achieving sufficient sustained design fidelity. Many of the products embossed in accordance with the process set forth herein may be subjected to the stress of outside weather conditions and must show sharp, crisp embossing contours over sustained periods of time. It is an important feature of the present invention to always provide a temperature of at least about 400° F. in embossing. Temperatures above 550° F., when used for sustained periods of time cause charring and are therefore generally unsuitable but can be used for very short time periods of up to about 60 seconds. The most suitable embossing temperature is in the range of about 400°–500° F. when using a pressure in excess of 1500 psi.

TIME

The period of time necessary for sufficient fidelity and permanence in re-shaping the surface of a consolidated board is dependent upon the temperature and pressure employed. For example, at a pressure of 4000 psi and a temperature of 500° F. only about 10 seconds is required. At lower temperatures and/or pressures the time is increased accordingly. For example, at a temperature of 400° F. and pressure of 2000 psi, the board should be hot-pressed at full pressure for a period of at least about 90 seconds. Other examples of embossing times required at various temperature and pressure conditions are set forth above under the headings PRESSURE and TEMPERATURE, and in the examples to follow.

An important feature of the present invention is the provision of a compressible cushion or backing member disposed to overlie a flat surface of the embossing press. The compressible backing member provides a yieldable support for cushioning the non-embossed side of the man-made board during post-press embossing. In this manner, a consolidated man-made board can be embossed to exceptionally surprising depths without fracturing.

A compressible backing member overlying one side of a platen press enables embossing of consolidated products at depths heretofore unknown in post-press embossing. By employing a compressible backing, the composite board can actually be molded—that is, contoured on both faces. Deep grooves can be imparted to the surface to actually cause a deformation of the non-embossed side of the board. The cushion permits the deformation of the non-embossed side of the board. Molding with a compressible cushion is most advantageous when hot-pressing thinner boards where a deep pattern is desired. It may be desirable to provide heat to both sides of the board during embossing to prevent warpage on removal from the press.

For use as a compressible cushion, many different materials are available, for example, a silicone rubber sheet, a porous or sponge rubber sheet, canvas, neoprenecoated asbestos cloth of four to six plies, or simply another piece of hardboard or other man-made board. It is preferred to use a premanently distortable compressible mat such as another piece of hardboard. A resilient cushion having a thickness of about ⅛ to ½ inch is generally sufficient for embossing any man-made board to any desired degree of contour. For example, when a series of products are manufactured from the same embossing plate, a consolidated board can be used as the cushion. After post-press embossing of one board, the cushion from that press step can be relocated to be embossed in the next pressing operation. This operation can be repeated using the cushion from one pressing operation as the product material to be embossed in the next successive embossing step.

Advantageously, the backing member can be of the same material and dimensions as the board being embossed. After embossing, the backing member can be repositioned to be embossed with a new backing member so that a new backing member is supplied for each embossing operation.

If desired, a binder can be provided between the backing member and the man-made board so that after embossing, the backing member is laminated to the man-made cellulosic board as an integral part of the product. In cases where the composite board is molded in the press, the laminated backing member can provide a flat surface for ease in attachment of the molded product to an existing structure.

EXAMPLES

The following examples will more fully and completely disclose minimum conditions under which a consolidated board must be pressed to achieve excellent design fidelity and to permanently re-shape the surface of a consolidated board. In each case, the time set forth is the minimum time necessary to achieve permanent sharp, crisp reproduction of the design of the embossing plate under the specified conditions of pressure and temperature. At a temperature of 550° F. or above the board should be removed before charring.

| Examples # | Pressure | Temperature (°F.) | Time (Sec.) | Hardboard; method made thickness, sp. gr. |
|---|---|---|---|---|
| 1 | 1000 | 550 | 45 | wet. formed. ¼", 0.99–1.00 |
| 2 | 1700 | 425 | 240 | dry formed, ¼", 0.95–1.00 |
| 3 | 1700 | 470 | 45 | wet formed, ¼", 0.85–0.90 |
| 4 | 1700 | 470 | 150 | dry formed, ¼", 0.95–1.00 |
| 5 | 1800 | 450 | 60 | wet formed, ¼", 0.85–0.90 |
| 6 | 1800 | 500 | 45 | wet formed, ¼", 0.85–0.90 |
| 7 | 2000 | 400 | 90 | wet formed, ¼", 0.85–0.90 |
| 8 | 2000 | 400 | 90 | dry formed, ¼", 0.95–1.00 |
| 9 | 2000 | 450 | 90 | wet formed, ¼", 0.99–1.00 |
| 10 | 2000 | 450 | 60 | wet formed ¼", 0.85–0.90 |
| 11 | 2000 | 450 | 90 | dry formed. ¼", 0.95–1.00 |
| 12 | 2000 | 500 | 45 | wet formed, ¼", 0.99–1.00 |
| 13 | 2000 | 500 | 20 | wet formed, ¼", 0.85–0.90 |
| 14 | 2000 | 550 | 15 | wet formed, ¼", 0.99–1.00 |
| 15 | 2500 | 450 | 30 | wet formed. ¼", 0.85–0.90 |
| 16 | 3000 | 450 | 25 | wet formed, ¼", 0.85–0.90 |
| 17 | 3000 | 450 | 45 | dry formed, ¼", 0.95–1.00 |
| 18 | 3000 | 450 | 45 | wet formed, ¼", 0.99–1.00 |
| 19 | 3000 | 500 | 15 | dry formed, ¼", 0.95–1.00 |
| 20 | 3000 | 500 | 10 | wet formed, ¼", 0.85–0.90 |
| 21 | 3000 | 550 | 10 | wet formed, ¼", 0.99–1.00 |
| 22 | 4000 | 450 | 10 | wet formed, ¼", 0.99–1.00 |
| 23 | 4000 | 450 | 15 | wet formed, ¼", 0.85–0.90 |

We claim:

1. A method of embossing a decorative man-made board comprising embossing a consolidated man-made board with a contoured embossing plate at a pressure of at least about 1000 psi, at a temperature of at least 400° F. and for a period of time sufficient to permanently reshape at least one surface of the man-made board.

2. A method as defined in claim 1 wherein the board is embossed at a pressure in the range of about 1000-5000 psi and for a period of time of from about 10 to 240 seconds.

3. A method as defined in claim 1 wherein said consolidated board is embossed at a temperature in the range of 400°-650° F.

4. A method as defined in claim 2 wherein the board is embossed at a pressure in the range of about 3000 to 5000 psi and for a period of time from 10 to 60 seconds.

5. A method as defined in claim 1 wherein the man-made consolidated board is embossed against a compressible cushion.

6. A method as defined in claim 5 wherein the compressible cushion is porous rubber.

7. A method as defined in claim 5 wherein the compressible cushion is a sheet of man-made board.

8. A method as defined in claim 5 wherein the compressible cushion is water-penetrable.

9. A method as defined in claim 1 wherein the man-made consolidated board is embossed in a platen press.

10. A method as defined in claim 1 wherein said consolidated board is embossed at a temperature in the range of 400°-550° F.

11. A method as defined in claim 5 wherein an adhesive is disposed between the board and the cushion to adhere the cushion to the board material during hot-pressing.

12. In a method of forming a decorative board including depositing fibers onto a surface to form a fibrous mat and compessing said fibrous mat to consolidate said mat into a consolidated board, the improvement comprising embossing said consolidated board with a contoured embossing plate at a pressure of at least 1000 psi, at a temperature of at least 400° F. and for a period of time sufficient to permanently reshape said board.

13. A method of embossing a decorative man-made board comprising embossing a consolidated man-made board with a contoured embossing plate, without first pre-wetting a surface of said board to be embossed, at a pressure of at least about 1000 psi, at a temperature of at least 400° F. and for a period of time sufficient to permanently reshape at least one surface of the man-made board.

14. In a method of forming a decorative board including depositing fibers onto a surface to form a fibrous mat and compressing said fibrous mat to consolidate said mat into a consolidated board, the improvement comprising embossing said consolidated board with a contoured embossing plate at a pressure of at least 1000 psi, at a temperature of at least 400° F. and for a period of time sufficient to permenently reshape said board, without pre-setting said consolidated board prior to embossing.

* * * * *